Dec. 25, 1951 H. C. RHODES 2,579,514
DOUGH PIECE CONTROLLED FLOUR DUSTER
Filed April 13, 1949 2 SHEETS—SHEET 1
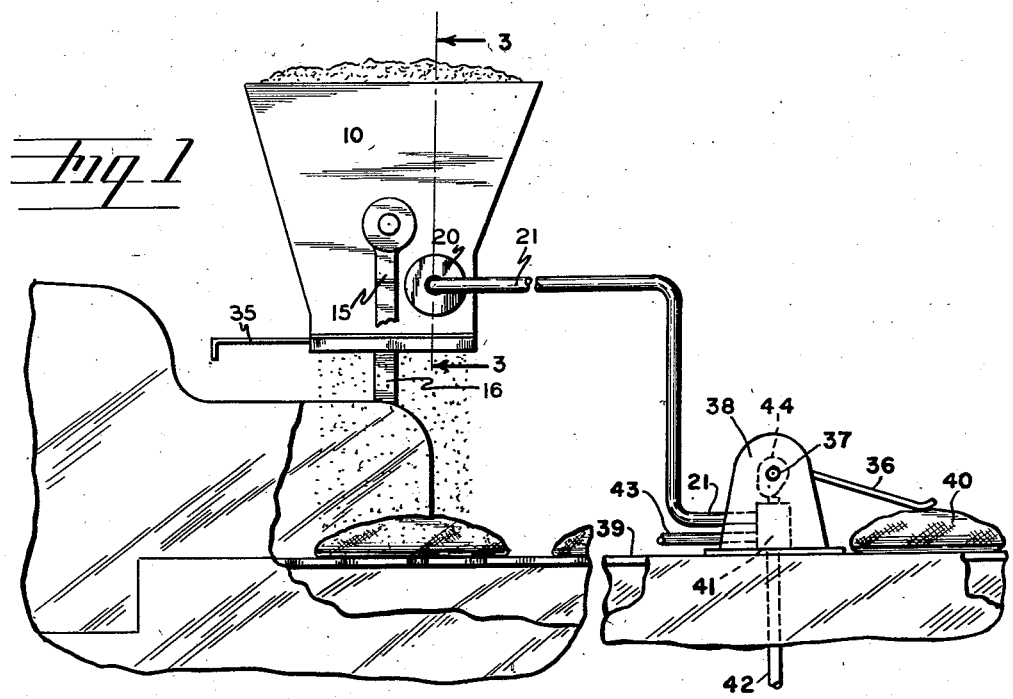
Fig. 1
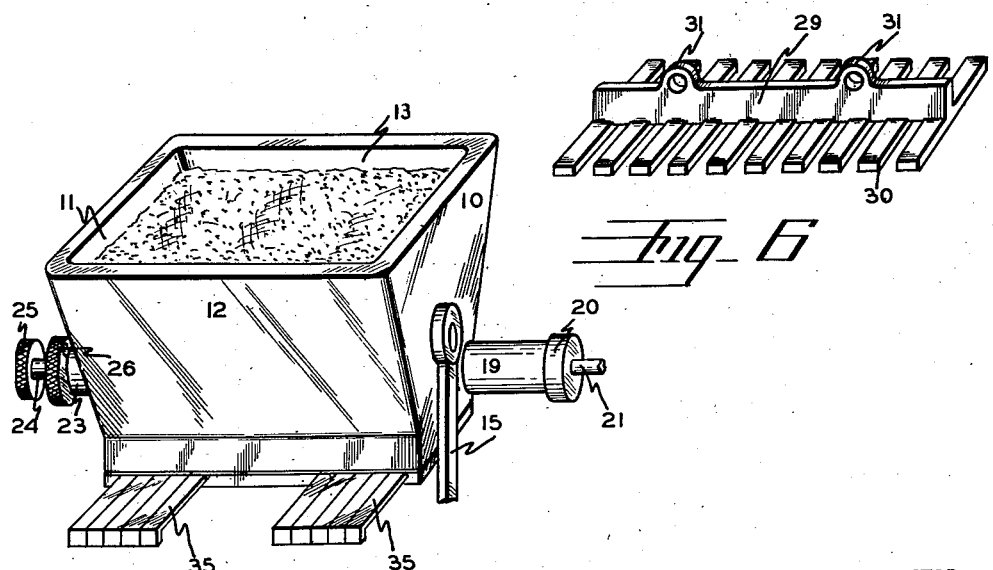
Fig. 2
Fig. 6
INVENTOR.
HERBERT C RHODES
BY
ATTORNEY Dec. 25, 1951 H. C. RHODES 2,579,514
DOUGH PIECE CONTROLLED FLOUR DUSTER
Filed April 13, 1949 2 SHEETS—SHEET 2
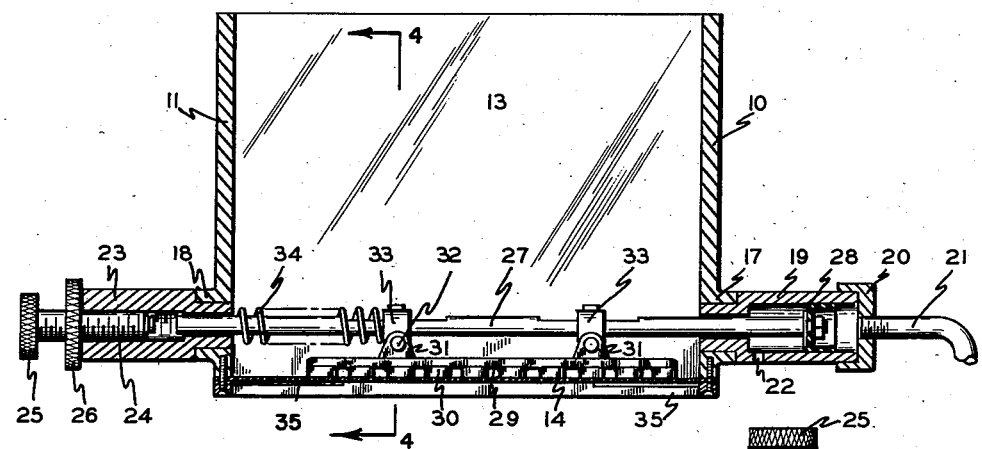
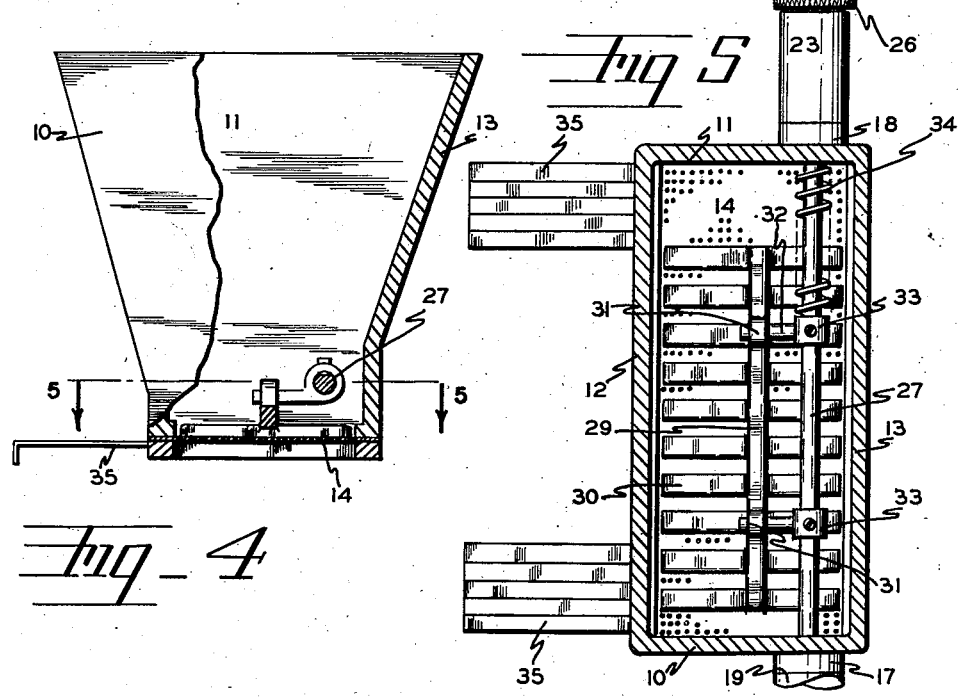
INVENTOR.
HERBERT C. RHODES
BY
ATTORNEY Patented Dec. 25, 1951

2,579,514

UNITED STATES PATENT OFFICE 2,579,514

DOUGH PIECE CONTROLLED FLOUR DUSTER

Herbert C. Rhodes, Portland, Oreg., assignor to Read Standard Corporation, a corporation of Delaware Application April 13, 1949, Serial No. 87,329

5 Claims. (Cl. 107—7)

The present invention pertains to the dusting of flour on dough, dough moulding rolls, dough conveyor belts or other members or parts of dough forming and molding devices employed in the manufacture of bread and similar products; and this application is a continuation in part of my copending application, Serial No. 39,627, filed under date of July 20, 1948, and entitled "Automatic Flour Duster."

The general object of the present invention, like that of the invention described in my above mentioned copending application, is to provide an improved means for the dusting of flour which will be automatic in operation and which will avoid any needless waste of the dusting flour.

A further object is to provide an improved flour dusting apparatus in which there will be a minimum amount of agitation or vibration and a minimum amount of wear of the parts of the device.

In the automatic flour duster of my above mentioned copending application the desired dusting of the flour is accomplished through an electrically vibrated dispensing screen. With my present invention the screen itself, through which the flour is sifted and dispensed, remains stationary while an agitator or scraper element of special design performs a limited, predetermined forward and back movement over the upper face of the screen to cause a momentary passage of dusting flour through the screen openings.

The manner in which the desired dusting is caused to take place, and the means by which the same is regulated and controlled in the device of the present invention, will be readily understood from the following brief description of my device, reference being made to the accompanying drawings in which:

Fig. 1 is a fragmentary side elevation of a dough molding machine showing the flour container, from which the flour dusting takes place, located above the same, and showing also the related control means by which the actuation of the duster is controlled;

Fig. 2 is a perspective view of the flour container of Fig. 1;

Fig. 3 is a vertical section through the flour container taken on line 4—4 of Fig. 1;

Fig. 4 is a vertical section at right angles to the section of Fig. 3 and thus taken on a plane indicated by the line 4—4 of Fig. 3;

Fig. 5 is a plan section corresponding to line 5—5 of Fig. 4; and

Fig. 6 is a perspective view of the agitator or scraper element which is located in the bottom of the flour container.

The flour container is formed with a pair of vertical end walls 10 and 11 (Fig. 2), and a pair of side walls 12 and 13 which slope outwardly and upwardly throughout most of their extent. The bottom wall of the flour container comprises a perforated plate or screen 14 (shown most clearly in Fig. 5). The flour container is supported between a pair of vertical arms 15 and 16 (Fig. 1), the upper ends of which are secured to the end walls of the container by bolts or other suitable means, and the bottom ends of which (not shown) are secured to the frame or to the sides of the dough molding machine or other device where the intermittent flour dusting is required.

The end walls 10 and 11 of the flour container are formed with flanged openings 17 and 18 respectively located near the bottom of the container and to one side of the longitudinal center line, and in alignment with each other, as shown in Figs. 3 and 5. A cylindrical housing 19 (Figs. 2 and 3) has its reduced end secured within the flanged opening 17. A cap 20 is mounted on the outer end of this cylindrical housing and a tube 21 has its end secured within a central opening in the cap 20. Compressed air is delivered through the tube 21, as explained later. The cylindrical housing 19 has an outlet port 22 located substantially in the position shown in Fig. 3.

A second cylindrical housing 23 is similarly secured in the flanged opening 18 (Fig. 3). This housing 23 has a threaded bore in which a threaded plug 24 is adjustably mounted. The plug 24 is formed with an outer knurled head 25 for convenience in manually adjusting the position of the plug 24, and a lock nut 26 is provided for holding the plug 24 securely in any position to which it is adjusted.

A shaft 27, extending horizontally through the lower portion of the flour container, has its ends slidably supported in the restricted openings in the inner ends of the cylindrical housings 19 and 23 respectively. As shown in Fig. 3, the shaft 27 is of such length that it may be given limited, reciprocating, longitudinal movement in its mountings. On the end of the shaft 27, within the housing 19, a flexible packing ring and a pair of holding washers for the same are secured and form together a piston head indicated by the reference character 28. Thus the housing 19, when receiving air under pressure through the tube 21, becomes in effect an air cylinder in which an air piston is actuated to produce movement of the piston rod or shaft 27.

A flour agitator or screen scraper element of special form, shown clearly in Figs. 5 and 6, is located within the flour container and is slidably supported on the bottom screen plate 14. This agitator or scraper is formed with a main center rib 29 and a plurality of parallel, equally spaced, lateral fingers 30. The bottom faces of the lateral fingers comprise flat surfaces, as apparent from Fig. 6, so as to coincide throughout their extent with the plane of the top face of the screen bottom plate 14. As indicated in Fig. 5, the entire agitator or scraper element is considerably shorter than the inside length of the bottom of the flour container to permit considerable endwise reciprocating movement of the agitator or scraper element as and when desired. A pair of ears 31 are formed on the top edge of the center rib 21, and stub shafts 32 have one end secured in these ears respectively as shown in Fig. 5. The other ends of these stub shafts 32 are secured in a pair of collars 33 respectively, which collars are carried on the shaft 27 and are adjustably secured to the shaft by suitable set screws. A coil spring 34 is carried on the shaft 27 and is held under compression between the inner end of the cylindrical housing 23, or the surrounding wall of the flour container, and the nearest collar 33, as shown in Fig. 3.

As will now be apparent from Fig. 3, whenever a charge of compressed air is delivered through the tube 21, the piston 28, and with it the shaft 27, and consequently the entire agitator element will be moved to the left (as viewed in Fig. 3), until the left end of the shaft 27 encounters the inner end of the plug 24; and when the charge of compressed air is shut off, the spring 34 will move the shaft 27 and agitator element back to the right to the starting position. The extent of such reciprocable travel of the shaft 27 and agitator element will consequently be determined by the position of the adjustable plug 24.

On the bottom of the flour container, at each end and beneath the bottom screen plate 14, a number of separate adjacent slides 35 are mounted. These slides comprise narrow flat strips of metal, as illustrated in Figs. 1 and 2, having turned-down outer ends to provide finger holds, and these slides are supported in horizontal slots provided in the bottom portions of the side walls 12 and 13 of the flour container which extend down below the level of the underside of the bottom wall 14. As apparent from Fig. 5, when these slides are pushed inwardly they serve to cover a portion of the underside of the bottom screen plate 14 and thus permanently reduce the discharging area. Ordinarily, however, the discharging of the dusting flour through the bottom screen plate will occur only through that portion of the screen plate over which the agitator element moves, and consequently the extent to which the reciprocable movement of the agitator element is restricted, by the adjustment of the plug 24 as previously described, limits the reciprocable movement of the shaft 27, and regulates the area through which the dusting charge takes place. Restriction of the size or area of the dusting charge is very desirable in avoiding waste of flour and accumulations or deposits of flour on portions of the traveling belts or dough molding rollers which do not have actual contact with the particular pieces of dough which are being delivered through the machine.

In order to provide for a control of the actuation of the flour dusting automatically, I use the simple control means illustrated in Fig. 1 which operates automatically whenever a piece of dough passes through such control means. The control means illustrated is similar to that described in my copending application, Serial No. 39,627, previously referred to, except that the control means includes an air control valve in place of the electric switch control mentioned in my copending application. Briefly, the control means of Fig. 1 includes a swinging valve-actuating plate 36, secured at its upper end to shaft 37, which shaft has its ends pivotally mounted in a pair of housings 38 located on opposite sides of a traveling belt 39 on which the pieces of dough 40 are carried. In one of the housings 38 an air control valve, indicated at 41 (Fig. 1), is mounted. This air valve is of well-known construction and need not be described. A cam element 44 operated by rotation of the shaft 37 acts to operate the air valve whenever the actuating plate 36 is lifted upwardly by engagement with a piece of dough in the manner illustrated in Fig. 1. Opening the air valve in this manner permits air to pass from a pipe 42 connected with some suitable source of air under pressure, into the pipe or tube 21. The lowering of the plate 26 to normal position, after its encounter with a piece of dough has ceased, permits the air valve to close under the influence of spring means in the valve, thereby shutting off the pipe 42 and opening an air exhaust outlet 43 for the pipe or tube 21. The pipe or tube 21, as previously explained, leads to the air cylinder 19 (Fig. 3).

Thus whenever a piece of dough encounters the control-actuating plate 36 the agitator element within the flour container makes a movement back and forth on the screen plate 14 covering a restricted area of predetermined extent, and this results in a limited and regulated charge of dusting flour being momentarily dropped on the roller or traveling belt or piece of dough below the flour container. All this is accomplished with a minimum amount of agitation, vibration or wearing of any of the parts of the device and without any excessive use or waste of the flour.

I claim:

1. In a flour duster of the character described, the combination of a flour container having a foraminous bottom, a shaft mounted in the lower portion of said container above said foraminous bottom, adjustable means for limiting the movement of said shaft in one direction, a fluid cylinder, a piston on said shaft within said cylinder, fluid pressure delivery means connected to one end of said cylinder, for moving said piston, and therewith said shaft in said first mentioned direction, spring means for moving said shaft in opposite direction upon the discontinuance of the fluid pressure in said cylinder, an agitator element slidably mounted on said foraminous bottom, said element connected with said shaft, a control valve for said fluid pressure delivery means, and a dough-contacting member operating said control valve, whereby fluid pressure will be delivered to said cylinder whenever said member is engaged by the dough.

2. In a flour duster of the character described, the combination of a flour container having walls and a foraminous bottom, a shaft extending through the lower portion of said container and spaced above said foraminous bottom, openings on opposite walls of said container, said shaft slidable axially within said openings, adjustable means adjacent one of said wall openings for limiting the movement of said shaft in one direction, a fluid cylinder located at the other of said openings, the other end of said shaft extending into said air cylinder, a piston on said shaft within said cylinder, fluid pressure delivery means connected to one end of said cylinder, for moving said piston, and therewith said shaft, in said first mentioned direction, spring means for moving said shaft in opposite direction upon the discontinuance of the fluid pressure in said cylinder, an agitator element slidably mounted on said foraminous bottom, said element connected with said shaft, a control valve for said fluid pressure delivery means, and a dough-contacting valve-actuating plate operating said control valve, whereby fluid pressure will be delivered to said cylinder whenever said valve-actuating plate is engaged by the dough.

3. In a flour duster, a flour container having side and end walls, a screen plate serving as the bottom of said container, a shaft extending through the lower portion of said container above said screen plate, openings on opposite walls of said container, said shaft slidable axially within said openings, means on the outside of one of said wall openings for limiting the outward movement of the corresponding end of said shaft, an air cylinder located at the other of said openings, the other end of said shaft extending into said air cylinder, a piston on said shaft within said cylinder, fluid pressure delivery means connected to the outer end of said cylinder, for moving said piston, and therewith said shaft, into engagement with said limiting means, spring means for moving said shaft in opposite direction upon the discontinuance of the fluid pressure in said cylinder, an agitator element slidably mounted on said screen plate, said element adjustably connected with said shaft, a control valve for said fluid pressure delivery means, and a dough-contacting member operating said control valve, whereby fluid pressure will be delivered to said cylinder whenever said member is engaged by the dough.

4. A flour duster of the character described including a flour container having side walls and a foraminous bottom, a shaft extending through the lower portion of said container and spaced above said foraminous bottom, openings on opposite walls of said container, said shaft slidable axially within said openings, means adjacent one of said wall openings for limiting the movement of said shaft in one direction, a fluid cylinder located at the other of said openings, the other end of said shaft extending into said air cylinder, a piston on said shaft within said cylinder, fluid pressure delivery means connected to one end of said cylinder, for moving said piston, and therewith said shaft, in said first mentioned direction into engagement with said limiting means, spring means for moving said shaft in opposite direction upon the discontinuance of the fluid pressure in said cylinder, an agitator element slidably mounted on said foraminous bottom, said element connected with said shaft, a control valve for said fluid pressure delivery means, and a dough-contacting member operating said control valve, whereby fluid pressure will be delivered to said cylinder whenever said member is engaged by the dough.

5. A flour duster comprising a flour container having side and end walls, a screen plate serving as the bottom of said container, a shaft extending through the lower portion of said container and spaced above said screen plate, openings on opposite walls of said container, said shaft slidable axially within said openings, adjustable means on the outside of one of said wall openings for limiting the outward movement of the corresponding end of said shaft, an air cylinder located at the other of said openings, the other end of said shaft extending into said air cylinder, a piston on said shaft within said cylinder, fluid pressure delivery means connected to the outer end of said cylinder, for moving said piston, and therewith said shaft into engagement with said adjustable limiting means, spring means for moving said shaft in opposite direction upon the discontinuance of the fluid pressure in said cylinder, an agitator element slidably mounted on said screen plate, said element adjustably connected with said shaft, a control valve for said fluid pressure delivery means, and a dough-contacting valve-actuating plate operating said control valve, whereby fluid pressure will be delivered to said cylinder whenever said valve-actuating plate is engaged by the dough.

HERBERT C. RHODES.

REFERENCES CITED

The following references are of record in the file of this patent:

UNITED STATES PATENTS

| Number | Name | Date |
| --- | --- | --- |
| 1,642,519 | Tiedke | Sept. 13, 1927 |
| 2,066,899 | Parsons | Jan. 5, 1937 |